Nov. 25, 1958 R. S. CURRY, JR 2,862,167
AUTOPILOT SERVOMOTOR SYSTEMS
Filed Dec. 8, 1953 2 Sheets-Sheet 2
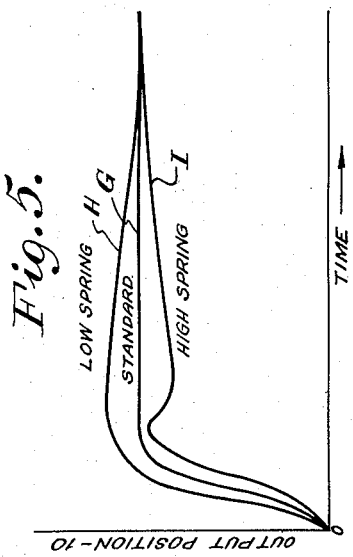
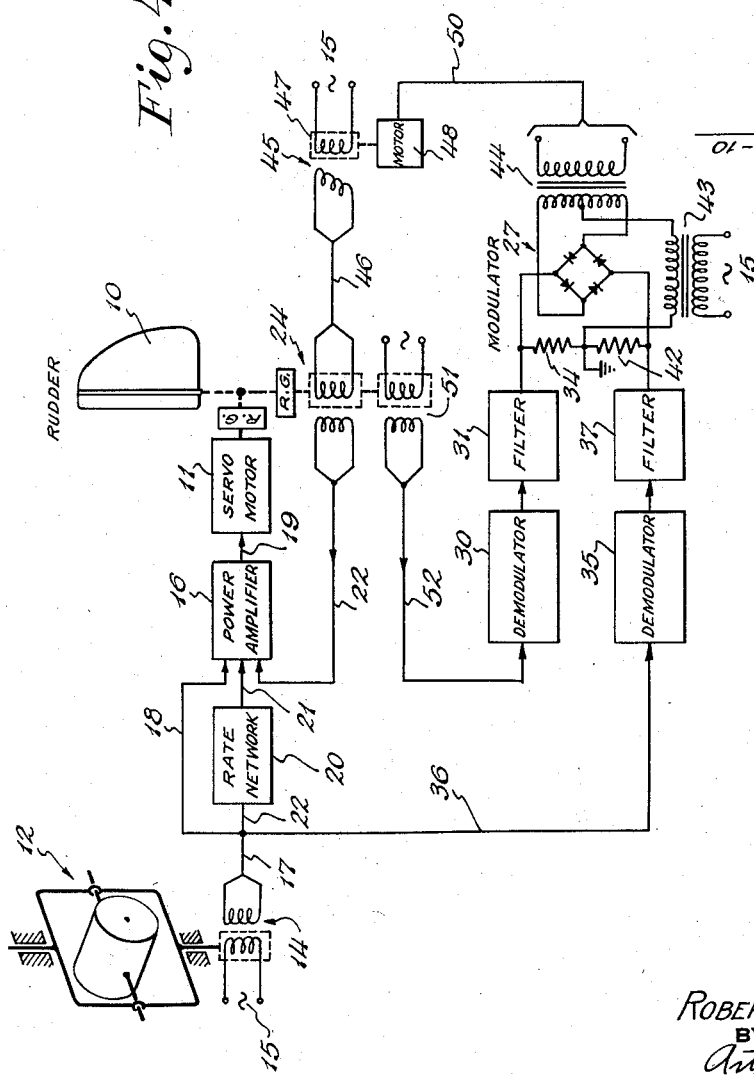
INVENTOR
ROBERT S. CURRY, JR.
BY
Arthur H. Serrell
ATTORNEY

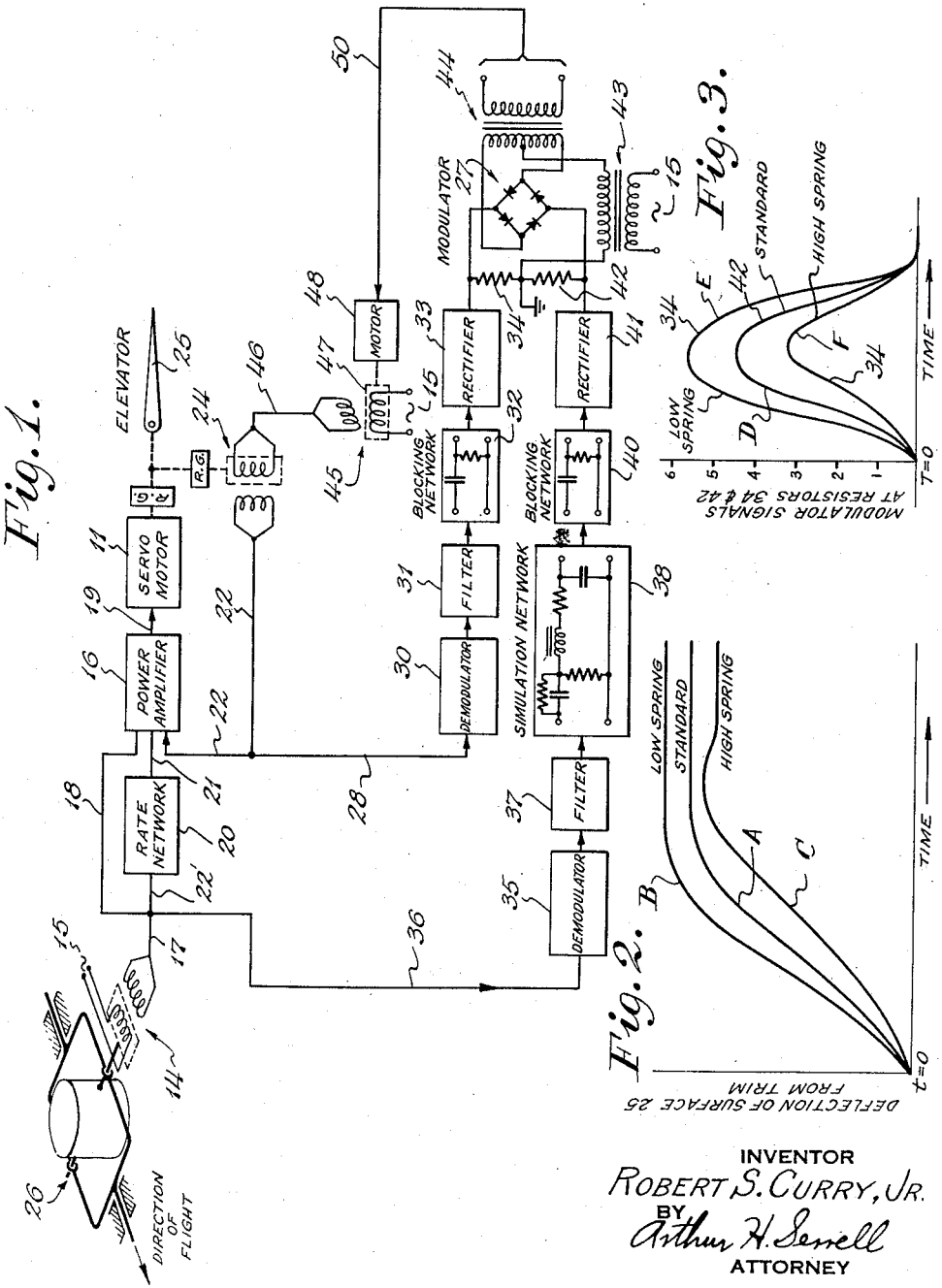

United States Patent Office 2,862,167
Patented Nov. 25, 1958

2,862,167

AUTOPILOT SERVOMOTOR SYSTEMS

Robert S. Curry, Jr., Baldwin, N. Y., assignor to Sperry Rand Corporation, a corporation of Delaware Application December 8, 1953, Serial No. 396,964

16 Claims. (Cl. 318—489)

This invention relates to an automatic pilot servo system of the character having automatically adjusted operating characteristics. The system establishes a performance standard for a particular load condition and accommodates itself to other load conditions by modification of its operating characteristics. For purposes of the present description, the variable load on the system may be considered to be a missile or aircraft with a control surface such as a rudder or elevator operable by the servomotor element of the system to move the dirigible craft about its yaw or pitch axis. Such a system is required to operate under varying conditions of loading or spring restraint on its control surface due, for example, to changes in the equivalent airspeed of the craft. Wide changes in load conditions have been known to alter the average and/or dynamic response of previous automatic pilot servo systems from an overdamped characteristic to one on the verge of instability and for high wind loading particularly as far as a rudder is concerned to cause the heading error of the system to increase beyond acceptable limits. When considering attitude stabilization of an aircraft operating under the influence of an automatic pilot, the craft moves in rotation about its center of gravity. Mathematically an aircraft with such controls can be represented as a simple spring mass and damping system. The aircraft has incorporated into its basic design inherent values of paddle wheel damping and weathercock spring effect which are required for satisfactory manual flight operation. The automatic pilot adds to the spring effect making it stiffer and thereby less subject to gust disturbances. To achieve proper stability characteristics under these conditions, the automatic pilot also synthesizes additional damping, by proper shaping with respect to time of the restoring moments produced by control surface action. The amount of additional damping used is a function of the attitude response characteristics required.

When an aircraft changes its airspeed, the inherent airframe spring and damping characteristics also change. The spring effect changes directly as the airspeed squared and the damping changes directly with the airspeed. Similarly, the centering force and damping effect on the craft's control surfaces act in like proportions and sense. The restoring moment produced about the center of gravity per degree of control surface deflection also varies directly as the airspeed squared. Thus, an aircraft operating under automatic control, when set to produce good attitude control at low airspeeds or landing conditions, will exhibit very sensitive response to control surface motions at high airspeeds.

The purpose of the invention is to eliminate the tendency of the servo system to oscillate with increasing load conditions. This is accomplished by establishing a standard performance characteristic for the automatic pilot system with which the actual performance of the system is compared. Any difference is used to change the servo system parameters controlling its inherent performance. For example, an increase in airspeed which increases the aerodynamic spring load on the control surface of the craft would result in a decrease in the control signal from the position repeatback of the system. The decrease in the position repeatback signal would reduce the synthetic spring effect and thereby maintain the proper ratio between the spring mass and damping effects for proper system stability.

The primary object of the present invention is to provide an automatic pilot servo system whose performance is maintained by modification of its operating characteristics in accordance with load conditions.

One of the features of the invention resides in the establishment of a predetermined operating performance standard in a system of the character described. In one of the specific embodiments of the invention herein illustrated, an electrical network whose parts simulate the inherent characteristics of the amplifier, the rate of change providing input means to the amplifier and the servomotor components of the system provide for the establishment of the performance standard.

Other objects, features and structural details of the invention will be apparent from the following description when read in connection with the accompanying drawing, in which:

Fig. 1 is a schematic view and wiring diagram of a servo system embodying the present inventive concepts;

Figs. 2 and 3 are graphs used in explanation of the operation of the servo system shown in Fig. 1;

Fig. 4 is a further schematic view and wiring diagram of a modified form of the invention; and Fig. 5 is a graph used in explanation of the operation of the servo system shown in Fig. 4.

As illustrated in Fig. 1, the improved automatic pilot servo system operates to control an object movable about an axis such as an aircraft. The load or variable spring restraint on the system is effective through the elevator surface 25 of the craft. As depicted the system operates to control the movements of the craft about its pitch axis. Control of the craft is exercised by the system through a suitable servomotor 11 that is operatively connected to the elevator 25 as indicated.

The improved system further includes a means for providing a signal in accordance with the angular displacement of the craft from a reference position about its pitch axis. Such means is provided, in the present instance, by a conventional gyro vertical 26 having an electrical data transmitter, synchro or pick-off 14. The gyro vertical 26 is mounted on the craft in a conventional manner with the major axis of the gimbal ring thereof either corresponding with or parallel to the roll or fore and aft axis of the craft. As shown, the pick-off 14 is a data transmitter whose stator is fixed to the gimbal ring of the gyro and whose rotor is fixedly connected to the rotor case of the gyro. The excitation for the pick-off 14 is obtained from a suitable source of alternating current electrical energy 15 by suitable connection to the rotor thereof. The provided reference means is mounted with freedom relative to the craft so that movement of the craft from the position established by the reference means results in an output from the pick-off 14 whose amplitude depends on the extent of the angular displacement and whose phase or polarity depends on the direction of the displacement with respect to the reference position. The gyro vertical 26 and pick-off 14 provide an attitude device or means that detects departure of the craft from a reference or level attitude about its pitch axis. The directional gyro 12 and pick-off 14 shown in Fig. 4 provides an equivalent device or means for the yaw axis of the craft.

The servomotor designated by the character 11, in this instance, is a suitable alternating current motor whose output shaft is directly connected to the elevator 25 by way of suitable reduction gearing. The servomotor element of the system is responsive to the output signal of the pick-off 14 of the reference means to cause actuation of the elevator 25 and consequent movement of the craft about its pitch axis in a direction to restore it to the reference position. As shown, the output from pick-off 14 of the reference means is fed a suitable power amplifier 16 by way of leads 17 and 18. The output of amplifier 16 is fed to the servomotor by way of lead 19. The reference means shown and described provides the primary controlling input to the servomotor 11 of the system. As shown, the system may also include a means providing a second control signal for the servomotor 11 in accordance with the rate of change of the craft displacement from a reference position about its pitch or other axis. In the arrangement shown in both Figs. 1 and 4 of the drawing, such means takes the form of a suitable rate network 20 connected by lead 21 to amplifier 16 to provide an input thereto. Lead 22' connects with the output lead 17 from the pick-off 14 to the rate network 20. The input to the amplifier 16 from network 20 is accordingly a measure of the rate of change of the signal output of the reference means.

The improved system as shown in both Fig. 1 and Fig. 4, further includes a repeatback input for controlling the servomotor 11 that is fed to the amplifier 16 by way of lead 22 from a pick-off 24. Pick-off 24, like pick-off 14, is a single phase electrical transmitter whose rotor is connected to the shaft of the elevator 25 through suitable reduction gearing. The stator of the pick-off 24 is connected to lead 22.

The elements of the system hereinsofar described are also shown in Fig. 4, except that a rudder 10 and a directional gyro 12 replace the respective elevator and gyro vertical parts included in Fig. 1. The system shown in Fig. 4 operates to control the craft about its vertical axis, the servomotor 11 being operatively connected to the rudder 10 through suitable reduction gearing.

In both illustrated forms of the invention, the excitation of synchro or pick-off 24 is varied in accordance with the monitoring output of the system as hereinafter more particularly described. The output of synchro 24 is fed the servomotor 11 by way of lead 22 to amplifier 16 in opposition to the input to the servomotor from the pick-off 14 of the provided reference means to thusly also provide a repeatback signal means for controlling the operation of the servomotor. The described repeatback means provides a third controlling input to the servomotor 11. This signal means also provides a measure of the output of the servomotor 11, the amplitude of the signal depending on the magnitude of the shaft motion of the servomotor in moving the rudder 10 or elevator 25 from a null condition, the phase or polarity of the signal depending on the direction of the motion. The signal of the servomotor repeatback signal means is utilized in the system shown in Fig. 1 as one of the inputs to a comparing means in the form of a modulator indicated at 27. Modulator 27 is connected to pick-off 24 by way of lead 28, a demodulator 30, a filter 31, a blocking network 32, and a rectifier 33. The demodulator 30 and filter 31 are of conventional types, the same functioning to convert the alternating current output of the signal pick-off 24 to a corresponding direct current signal. The resistance-capacitance couple indicated as the blocking network 32 eliminates all steady state components of the signal received from the filter 31. The rectified output of network 32 appears across the resistor 34 of the modulator 27, the signal thereof representing a measure of the rate of movement of the elevator 25 under control of the servomotor 11.

The improved automatic pilot servo system further includes a means for providing a signal in accordance with a performance standard for the system for a particular load condition. Such means, as shown in Fig. 1, is connected to the reference signal means provided by the gyro vertical 26 and pick-off 14 of the system and includes a suitable demodulator 35 whose input is obtained from the displacement pick-off 14 by way of lead 36 and lead 17. The output of demodulator 35 is then passed through a suitable electrical filter indicated at 37. Both demodulator 35 and filter 37 provide for conversion of the alternating current input signal from pick-off 14 to a corresponding direct current signal in the system. As herein shown, the resulting direct current signal is then passed through a simulation network 38. The resistance, capacitance and inductance elements of the simulation network 38 are so chosen as to simulate the inherent characteristics in the system of the amplifier 16, the rate network 20 and the servomotor 11. In other words, the network 38 modifies its input signal in substantially the same manner as the primary signal in the system is modified by the amplifier 16, rate network 20 and servomotor 11 before appearing as the output of the system.

The direct current output of the simulation network 38 provides a measure of the desired performance of the system for a particular load condition. As shown in Fig. 1, the output of network 38 is fed to a blocking network 40, similar in character to network 32, which eliminates the steady state components of the signal from network 38. The output of the blocking network 40 after rectification in a suitable rectifier 41 appears across a resistor 42 which forms a part of the comparing means provided by modulator 27. The resistors 34, 42 are arranged in balancing relation in the modulator 27 and have a common ground connection. Modulator 27 receives electrical power from the suitable alternating current source 15 by way of transformer 43. The comparing means or modulator 27 is designed to provide a monitoring alternating current output signal when the respective direct current signals across resistors 34 and 42 are of unequal magnitudes and polarities. Such a monitoring signal appears across the secondary winding of an amplifying transformer 44.

The means for modifying the operating characteristics of the automatic pilot servo system illustrated in Figs. 1 and 4 may be provided by a further electrical synchro or pickoff 45 whose stator winding is connected to the rotor winding of pick-off 24 by way of lead 46. The wound rotor 47, of pick-off 45 is excited from the suitable source 15 of alternating current electrical energy. By changing the position of the rotor 47, the excitation of the repeatback pick-off 24 is varied. This results in a corresponding change in the repeatback input to the servomotor 11 and modification of the operational characteristics of the system under conditions of load other than the particular load designed for the standard performance. Adjusting means for the modifying means are herein provided in the form of an alternating current motor 48 operatively connected to the rotor 47 of synchro 45. The motor 48 is driven by the output of the comparing means or modulator 27 by way of lead 50 from transformer 44 to the control field winding of the motor. Motor 48 operates to continue to change the position of rotor 47 until the required performance of the system is obtained with a null output from modulator 27.

In the dynamic type of system illustrated in Fig. 1, adapted to handle transient characteristics, the required performance standard for a particular load condition appears as a signal across resistor 42. This signal is compared with a similar signal which appears across resistor 34 that is dependent upon the output of the system as provided by servomotor 11. Fig. 2 shows the relationship with regard to time between the output of the system or deflection of the elevator surface 25 from trim under different load conditions with a fixed input control signal. The network 38 of the system is designed so that for a particular load on surface 25, the system provides a signal in accordance with a performance standard or response as noted by curve A in Fig. 2.

Curves B and C illustrate deflections of the elevator for the same input control signal but at respective low spring or high spring load conditions as compared to the particular load. In conditions of low spring loading the surface deflection is greater than the standard or particular load. In conditions of high spring loading, the surface deflection is less than the standard or particular load. This condition is clearly indicated by the curves A, B and C of Fig. 2. The improved system functions to maintain the performance standard with variance in the loading or spring restraint conditions on the control surface by modifying the operating characteristics of the system so that the deflections represented by curves B and C are not actually attained.

In explanation of the operation of the system, Fig. 3 shows the relation between the signals at resistors 34 and 42 of the system with regard to time for different loading conditions. The standard signal is represented by curve D. This signal appears across resistor 42 as the system operates with a controlling input from pick-off 14. The response of the servomotor 11 is represented by curve E for loads less than the design load and coming from repeatback pick-off 24 appears across resistor 34. Curve F depicts the signal at resistor 34 where the spring load is higher than the standard. Where the load is lower than the standard as shown in curve E, and the resulting signal at 34 is higher than the standard, modulator 27 provides an output to motor 48 to move the rotor 47 of pick-off 45 to increase the excitation of the repeatback means of the system. This modifies the operating characteristics of the system so that less elevator deflection is required for the considered load condition and the resultant output of repeatback pick-off 24 decreases. The signal at resistor 34 is accordingly decreased until the system attains a balanced condition with no corrective output from modulator 27. Where the signal at resistor 34 is below that provided at resistor 42, the modulator 27 provides an output to drive motor 48 in the reverse direction to decrease the excitation of the repeatback pick-off 24. With this considered condition, more elevator or surface deflection is required of the system with consequent increase in the output of the pick-off 24. The signal at resistor 34 is accordingly increased to restore the system to a balanced condition. Actually, whether the load is higher or lower than the standard, the system is immediately effective to correct any condition of unbalance at modulator 27 as illustratively depicted by curves E and F in Fig. 3. In effect, the system operates to maintain the sum of the two variables, spring load and operating characteristics of the system equal to the established standard.

The system illustrated in Fig. 4 is particularly useful in cases where a sustained error at the reference input signal means is required to maintain the control surface or rudder 10 in a specific position. This system is effective for modifying characteristics of the average or long period type and differs from the dynamic type of system shown in Fig. 1 in the elimination of the simulation and blocking networks 38, 32 and 40 and the rectifiers 33, 41. While the repeatback control is similar, the system of Fig. 4 employs a separate pick-off 51 connected by lead 52 to demodulator 30, filter 31 and resistor 34 of the modulator 27. In this instance, the modulator 27 compares representative displacement signals from pick-offs 14 and 51, the signal at resistor 42 being the established standard for the system. Fig. 5 shows a set of curves similar to those described in detail in connection with Fig. 2. In Fig. 5 curve G shows the standard output deflection of the rudder 10 with regard to time for a fixed input control signal. Curves H and I correspond with curves B and C in Fig. 2 for respective conditions of low and high spring or load condition relative to the particular load condition employed in establishing the standard of operation for the system. The system shown in Fig. 4 operates in the same manner as described in connection with Fig. 1, the operating characteristics of the system being varied to maintain the performance standard.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A servo system for automatically piloting a dirigible craft movable about an axis subject to changeable load conditions including a servomotor operable to cause the craft to move about its axis means detecting departure of the craft from a reference attitude condition relative to the axis providing a signal for controlling the operation of said servomotor, means connected to said signal reference means providing a signal in accordance with a performance standard for the system for a particular load condition of the craft, signal means for measuring the output of said servomotor, means for comparing the signals of said performance standard means and output measuring signal means to provide a monitoring output under other load conditions of the craft, means for modifying the operating characteristics of the system, and means for adjusting said modifying means in accordance with said monitoring output signal to vary the operating characteristics of the system under the other load conditions to maintain the performance standard.

2. A servo system for automatically piloting an aircraft movable about an axis subject to changeable load conditions including a servomotor operable to cause the aircraft to move about the axis, means for operating said servomotor providing a signal in accordance with the angular displacement of the aircraft from a reference position about the axis, means connected to said displacement signal means providing a signal in accordance with a performance standard for the system for a particular load condition of the aircraft, signal means for measuring the output of said servomotor, means for comparing the signals of said performance standard means and output measuring signal means to provide a monitoring output under other load conditions of the aircraft, means for modifying the operating characteristics of the system, and means for adjusting said modifying means in accordance with said monitoring output signal to vary the operating characteristics of the system and thereby maintain the performance standard for the other load conditions.

3. In an automatic pilot servo system, the combination of, a servomotor subject to changeable load conditions, an attitude reference device providing an input to the servomotor, means connected to said reference input device for providing a performance standard signal for the system in accordance with a particular load condition, signal means for measuring the output of the servomotor, and means connected to said output signal means and performance standard signal means for modifying the operating characteristics of the system so that it operates in accordance with the performance standard for other load conditions.

4. In an automatic pilot servo system, the combination of, a servomotor subject to changeable load conditions, an amplifier providing an input to the servomotor, an attitude reference device providing an input to the amplifier, repeatback means for the servomotor providing an input to the amplifier, means for adjusting the excitation of said repeatback means, means connected to said reference input device for providing a performance standard signal for the system in accordance with a particular load condition, signal means for measuring the output of the servomotor, and means connected to said output signal means and performance standard signal means for operating said repeatback excitation adjusting means to modify the operating characteristics of the system so that it operates in accordance with the performance standard for other load conditions.

5. In an automatic pilot servo system, the combination of, a servomotor subject to changeable load conditions, an amplifier providing an input to the servomotor, an attitude reference device providing an input to the amplifier, repeatback means for the servomotor providing an input to the amplifier, means connected to said reference input device for providing a performance standard signal for the system in accordance with a particular load condition, and means operated by the outputs of said repeatback means and the performance standard signal means for modifying the operating characteristics of the system so that it operates in accordance with the performance standard for other load conditions.

6. The combination claimed in claim 5, in which said modifying means includes means for adjusting the excitation of said repeatback means.

7. A servo system for automatically piloting a dirigible craft movable about an axis subject to changeable load conditions including a servomotor operable to cause the craft to move about the axis, means detecting departure of the craft from a reference condition relative to the axis providing a displacement signal output for controlling the operation of said servomotor, means for providing a repeatback signal for controlling said servomotor, means for adjusting the excitation of said repeatback signal means, means connected to said signal reference means for providing a performance standard signal for the system in accordance with a particular load condition on the craft, signal means for measuring the output of the servomotor, and means connected to said output measuring means and performance standard signal means for operating said repeatback excitation adjusting means to modify the operating characteristics of the system so that it operates in accordance with the performance standard for other load conditions on the craft.

8. A servo system for automatically piloting a dirigible craft movable about an axis subject to changeable load conditions including a servomotor operable to cause the craft to move about the axis, means detecting departure of the craft from a reference condition relative to the axis providing a displacement signal output for controlling the operation of said servomotor, means for providing a repeatback signal for controlling said servomotor, means connected to said signal reference means for providing a performance standard signal for the system in accordance with a particular load condition on the craft, and means operated by the signals of said repeatback signal means and said performance standard signal means for modifying the operating characteristics of the system so that it operates in accordance with the performance standard for other load conditions on the craft.

9. A servo system as claimed in claim 8 in which said modifying means includes means for adjusting the excitation of said repeatback signal means.

10. The combination in an automatic pilot servo system of, a servomotor subject to changeable load conditions, an amplifier providing an input to the servomotor, an attitude reference device providing an input to the amplifier, repeatback means for the servomotor providing an input to the amplifier, and means for modifying the operating characteristics of the system operable through said repeatback means, said modifying means including means for providing a performance standard signal for the system in accordance with a particular load condition.

11. The combination claimed in claim 10, in which said performance standard providing means is an electrical network connected to said reference device that simulates the inherent characteristics of the amplifier and servomotor components of the system.

12. The combination claimed in claim 10, including means for providing a third input to said amplifier in accordance with the rate of change of the input thereto from said reference device, and in which said performance standard providing means is an electrical network that simulates the inherent characteristics of the amplifier, the rate of change providing input means, and the servomotor components of the system.

13. In an automatic pilot servo system, the combination of, a servomotor subject to changeable load conditions, an amplifier providing an input to the servomotor, an attitude reference device providing an input to the amplifier, repeatback means for the servomotor providing a second input to the amplifier, and an electrical network connected to the reference device that simulates the inherent characteristics of the amplifier and servomotor components of the system to provide a performance standard output signal for the system in accordance with a particular load condition.

14. The combination claimed in claim 13, including a second electrical network operable to block the steady state component of the signal output of the first network.

15. In an automatic pilot servo system, the combination of, a servomotor subject to changeable load conditions, an amplifier providing an input to the servomotor, reference means for the system providing an input to the amplifier, means for providing a second input to said amplifier in accordance with the rate of change of input thereto from said reference means, repeatback means for the servomotor providing a third input to the amplifier, and means for providing a performance standard signal for the system in accordance with a particular load condition including an electrical network connected to the reference input means that simulates the inherent characteristics of the amplifier, the rate providing input means and the servomotor components of the system.

16. The combination claimed in claim 15, in which said performance signal standard means further includes a second electrical network operable to block the steady state components of the signal output of the first network.

References Cited in the file of this patent

UNITED STATES PATENTS

| | | |
|---|---|---|
| 2,615,658 | Young | Oct. 28, 1952 |
| 2,621,873 | Gordon | Dec. 16, 1952 |
| 2,666,177 | Brannin | Jan. 12, 1954 |
| 2,762,006 | Blanchard | Sept. 4, 1956 |
| 2,762,007 | Blanchard | Sept. 4, 1956 |